(12) United States Patent
Olney

(10) Patent No.: US 8,892,961 B2
(45) Date of Patent: *Nov. 18, 2014

(54) METHODS AND SYSTEMS FOR OPTIMIZING INFORMATION TECHNOLOGY COSTS BASED ON OUTAGE COSTS

(71) Applicant: The Boeing Company, Seal Beach, CA (US)

(72) Inventor: Guy Baron Olney, Sammamish, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/090,745

(22) Filed: Nov. 26, 2013

(65) Prior Publication Data

US 2014/0101493 A1 Apr. 10, 2014

Related U.S. Application Data

(63) Continuation of application No. 12/969,098, filed on Dec. 15, 2010, now Pat. No. 8,595,565.

(51) Int. Cl.
| | | |
|---|---|---|
| *G06F 11/00* | (2006.01) | |
| *H04L 12/24* | (2006.01) | |
| *G06F 11/07* | (2006.01) | |
| *G06F 11/34* | (2006.01) | |

(52) U.S. Cl.
CPC ........ *G06F 11/3419* (2013.01); *H04L 41/5035* (2013.01); *H04L 41/5009* (2013.01); *G06F 11/0754* (2013.01); *G06F 11/0709* (2013.01); *G06F 11/00* (2013.01); *H04L 41/5077* (2013.01)
USPC ............. 714/47.3; 714/25; 714/46; 714/47.1; 714/47.2; 714/48

(58) Field of Classification Search
USPC .............................. 714/25, 26, 47.1, 47.2, 48
See application file for complete search history.

(56) References Cited

U.S. PATENT DOCUMENTS

| | | | |
|---|---|---|---|
| 5,373,537 A | 12/1994 | Oberhauser et al. | |
| 5,959,969 A | 9/1999 | Croslin et al. | |
| 6,522,939 B1 | 2/2003 | Strauch et al. | |
| 6,654,914 B1 * | 11/2003 | Kaffine et al. | 714/43 |
| 6,785,850 B2 * | 8/2004 | Dzoba et al. | 714/46 |
| 6,877,115 B2 * | 4/2005 | Herman | 714/46 |
| 6,996,751 B2 * | 2/2006 | Harper et al. | 714/48 |
| 7,251,754 B2 * | 7/2007 | Maxwell | 714/43 |
| 7,302,617 B2 * | 11/2007 | Wookey | 714/47.2 |
| 7,305,466 B1 * | 12/2007 | Kaffine et al. | 709/224 |
| 7,315,856 B2 * | 1/2008 | Iulo et al. | 714/48 |
| 7,383,191 B1 | 6/2008 | Herring et al. | |
| 7,730,364 B2 * | 6/2010 | Chang et al. | 714/47.2 |
| 7,779,300 B2 | 8/2010 | Moon | |
| 7,830,874 B2 * | 11/2010 | Cornwall et al. | 370/389 |
| 2002/0116347 A1 * | 8/2002 | Snelgrove | 705/400 |
| 2004/0039958 A1 * | 2/2004 | Maxwell | 714/4 |
| 2004/0205398 A1 | 10/2004 | Osborn et al. | |
| 2005/0096930 A1 * | 5/2005 | Maxwell | 705/1 |

(Continued)

*Primary Examiner* — Joshua P Lottich
(74) *Attorney, Agent, or Firm* — Armstrong Teasdale LLP

(57) ABSTRACT

A method that includes monitoring, by a computing device including a processor, transaction activity level of a plurality of pre-defined IT transactions, and determining, by the computing device, that an IT outage has occurred when the activity level is below a threshold.

18 Claims, 4 Drawing Sheets

(56) References Cited

U.S. PATENT DOCUMENTS

| | | |
|---|---|---|
| 2005/0096953 A1* | 5/2005 | Washington et al. ............. 705/7 |
| 2005/0119905 A1 | 6/2005 | Wong et al. |
| 2008/0189225 A1 | 8/2008 | Herring et al. |
| 2008/0215355 A1 | 9/2008 | Herring et al. |
| 2009/0031174 A1 | 1/2009 | Moon |
| 2010/0031156 A1 | 2/2010 | Doyle et al. |
| 2010/0138699 A1* | 6/2010 | Klein ............... 714/47 |
| 2010/0153769 A1* | 6/2010 | Santos et al. ...................... 714/2 |
| 2011/0261710 A1* | 10/2011 | Chen et al. ................... 370/252 |
| 2012/0096539 A1* | 4/2012 | Hu et al. ......................... 726/13 |

\* cited by examiner

METHODS AND SYSTEMS FOR OPTIMIZING INFORMATION TECHNOLOGY COSTS BASED ON OUTAGE COSTS

CROSS REFERENCE TO RELATED APPLICATIONS

This application is a continuation of U.S. patent application Ser. No. 12/969,098, filed Dec. 15, 2010, now U.S. Pat. No. 8,595,565, which is incorporated herein by reference in its entirety.

BACKGROUND

The field of the disclosure relates generally to systems used to measure information technology availability.

The availability of an information technology (IT) system may be difficult to measure. IT availability is generally measured as a percentage of hardware component uptime based on problems reported in a ticketing system or based on hardware monitoring. When an end user is using a large or highly integrated system, transactions may transit many system components. Because many system components may be used in large integrated systems, measuring single component uptime percentages may not accurately provide end-to-end availability as seen by the end user. In such cases, the percentage of uptime may not exhibit a direct relationship to the impact of the outage to the business. As a result, it may be difficult to also measure the actual cost of IT outages in such systems.

Because IT availability and actual costs of IT outages are difficult to measure, efficiently focusing resources and capital to address the availability problem is challenging. Accordingly, there is a need for systems to assist in assessing the value of IT availability with the ability to provide improvements based on a measured benefit.

BRIEF DESCRIPTION

In one aspect, a method is provided. The method includes monitoring, by a computing device including a processor, transaction activity level of a plurality of pre-defined IT transactions, and determining, by the computing device, that an IT outage has occurred when the activity level is below a threshold.

In another aspect, a device for use in determining a cost of an information technology (IT) outage is provided. The device includes a memory configured to store an expected transaction activity level, and a communications unit configured to monitor IT transactions. The device also includes at least one processor coupled to said memory and said communications unit, wherein said processor is programmed to determine that an IT outage has occurred based on the monitored IT transactions and the expected transaction activity level, record a start of the IT outage based on the determination that an IT outage has occurred, and determine that the IT outage has ended based on the monitored IT transactions. The at least one processor is also programmed to record an end of IT outage based on the determination that the IT outage has ended, and determine a cost associated with the IT outage based at least in part on the recorded start and end of the IT outage.

In yet another aspect, a computer program product comprising computer-readable memory and program code having computer-executable components is provided. The computer-executable components include a monitoring component that when executed by at least one processor unit causes the at least one processor unit to monitor information technology (IT) transactions, and determine that an IT outage has occurred, based on the monitored IT transactions, and a recommendation component that when executed by at least one processor unit causes the at least one processor unit to determine a cost associated with the IT outage.

The features, functions, and advantages that have been discussed can be achieved independently in various embodiments or may be combined in yet other embodiments further details of which can be seen with reference to the following description and drawings.

DETAILED DESCRIPTION

The described embodiments are directed to a method of reducing the business impact of information technology (IT) outages. In an exemplary embodiment, IT transactions are monitored to determine when an IT outage has occurred, and a cause of the IT outage is determined. A solution is produced to restore the outage, and after restoration of the IT, a cost associated with the outage is determined. With the IT outage cost information, preventative measures are introduced and costs associated with implementing the preventive measures are determined. Embodiments provided herein facilitate IT investment effectiveness and minimizes disruption to the revenue stream.

Figure 1:
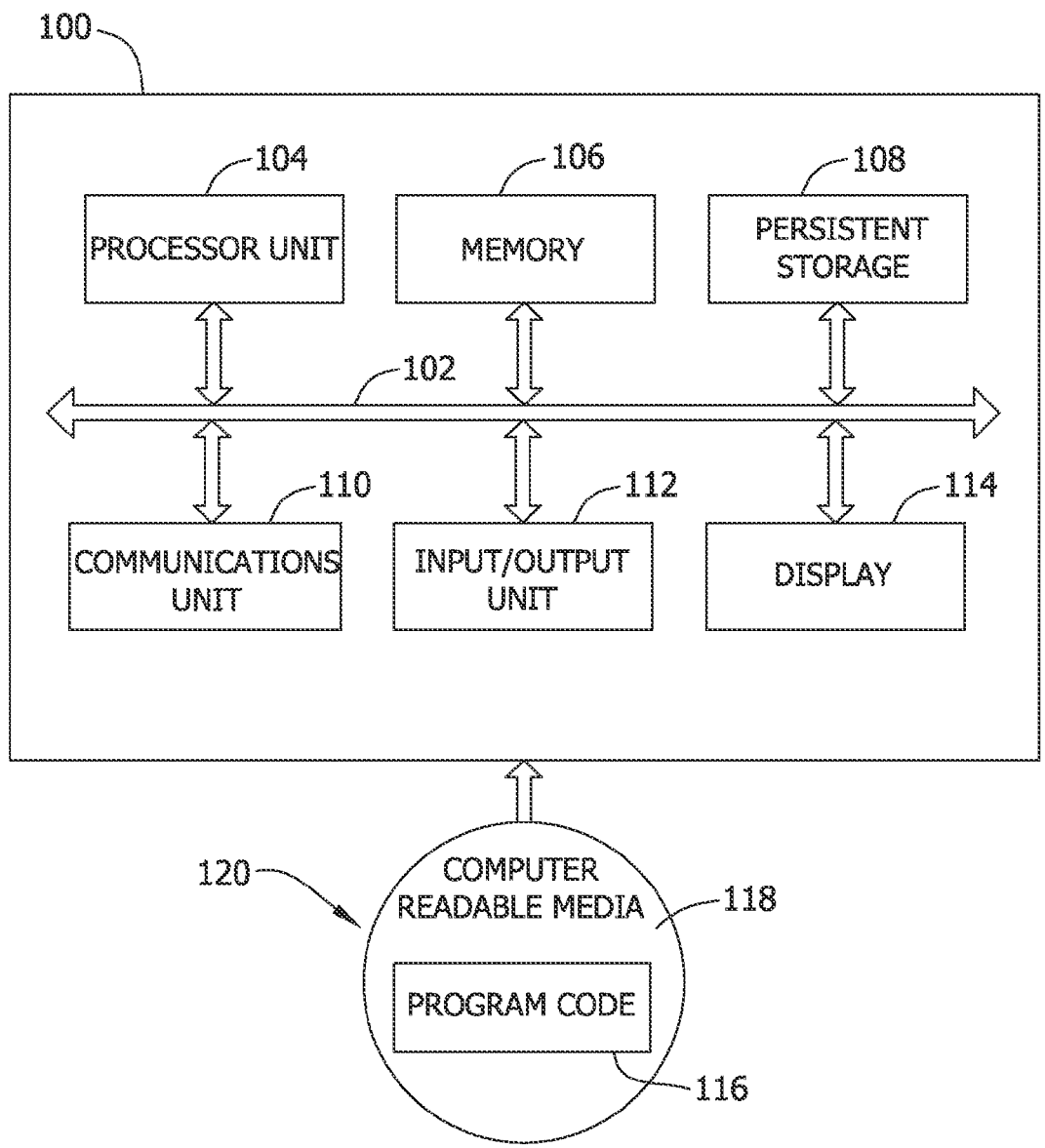
FIG. 1 is a block diagram of an exemplary computer system.

FIG. 1 is a block diagram of an exemplary computer system 100. In the exemplary embodiment, computer system 100 includes communications fabric 102 that enables communications between a processor unit 104, a memory 106, persistent storage 108, a communications unit 110, an input/output (I/O) unit 112, and a presentation interface, such as a display 114. In addition to, or in the alternative, the presentation interface may include an audio device (not shown) and/or any device capable of conveying an output to a user.

In the exemplary embodiment, processor unit 104 executes instructions for software that may be loaded into memory 106. Processor unit 104 may be a set of one or more processors, or may be a multi-processor core, depending on the particular implementation. Further, processor unit 104 may be implemented using one or more heterogeneous processor systems in which a main processor is present with secondary processors on a single chip. In another embodiment, processor unit 104 may be a symmetric multi-processor system containing multiple processors of the same type.

Memory 106 and persistent storage 108 are exemplary storage devices. As used herein, a storage device is any piece of hardware that is capable of storing information either on a temporary basis and/or a permanent basis. Memory 106, in these examples, may be, without limitation, a random access memory or any other suitable volatile or non-volatile storage device. Persistent storage 108 may take various forms depending on the particular implementation. For example, without limitation, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, without limitation, a removable hard drive may be used for persistent storage 108.

Communications unit 110, in these examples, enables communications with other computer systems or devices. In these examples, communications unit 110 is a network interface card. Communications unit 110 may communicate through the use of either, or both, physical and wireless communication links.

Input/output unit 112 enables input and output of data with other devices that may be connected to computer system 100. For example, without limitation, input/output unit 112 may provide a connection for user input through a user input device, such as a keyboard and/or a mouse. Further, input/output unit 112 may transmit output to a printer. Display 114 provides a mechanism to display information to a user. For example, a presentation interface such as display 114 may display a graphical user interface, such as those described herein.

In the exemplary embodiment, instructions for the operating system and applications or programs are located on persistent storage 108. These instructions may be loaded into memory 106 for execution by processor unit 104. The processes of the different embodiments may be performed by processor unit 104 using computer implemented instructions and/or computer-executable instructions, which may be located in a memory, such as memory 106. Such instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located on computer readable media 118 that is selectively removable and that enables such instructions to be loaded onto or transferred to computer system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to computer system 100. The tangible form of computer readable media 118 is also referred to as computer recordable storage media. In some instances, computer readable media 118 may not be removable.

Alternatively, program code 116 may be transferred to computer system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 116 may be downloaded over a network to persistent storage 108 from another device or computer system for use within computer system 100. For instance, program code stored in a computer readable storage medium in a server computer system may be downloaded over a network from the server to computer system 100. The computer system providing program code 116 may be a server computer, a client computer, or some other device capable of storing and transmitting program code 116.

Program code 116 may be organized into computer-executable components that are functionally related. For example, program code 116 may include a transaction receiving component, a validation component, a display component, and/or any component suitable for the methods described herein. Each component may include computer-executable instructions that, when executed by processor unit 104, cause processor unit 104 to perform one or more of the operations described herein.

The different components illustrated for computer system 100 are not meant to provide architectural limitations to the manner in which different embodiments may be implemented. The different illustrative embodiments may be implemented in a computer system including components in addition to or in place of those illustrated for computer system 100. Other components shown in FIG. 1 can be varied from the illustrative examples shown. For example, a storage device in computer system 100 is any hardware apparatus that may store data. Memory 106, persistent storage 108 and computer readable media 118 are examples of storage devices in a tangible form.

In another example, communications fabric may be implemented as a bus system and may include one or more buses (not shown), such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 106 or a cache such as that found in an interface and memory controller hub that may be present in communications fabric 102.

Figure 2:
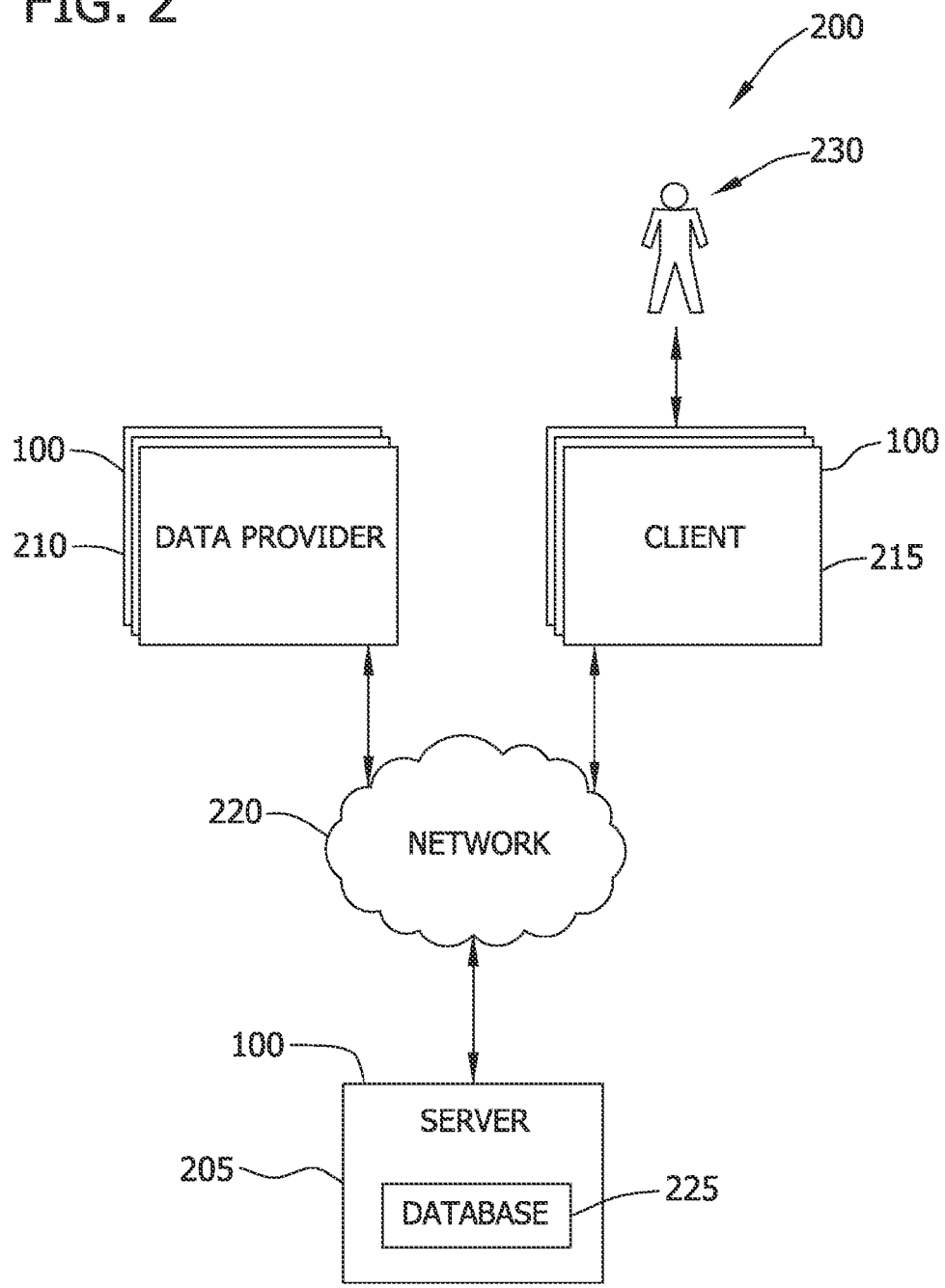
FIG. 2 is a block diagram illustrating an exemplary system that may be used in executing a data transaction.

FIG. 2 is a block diagram of an exemplary system 200 that may be used to measure IT availability. In the exemplary embodiment, system 200 includes a server 205, a data provider 210, and a client computer system 215 coupled in communication via a network 220. Network 220 may include, without limitation, the Internet, a local area network (LAN), a wide area network (WAN), a wireless LAN (WLAN), a mesh network, and/or a virtual private network (VPN).

Server 205, data provider 210, and client computer system 215 are separate examples of computer system 100 (shown in FIG. 1). In the exemplary embodiment, each computing device 100 is coupled to network 220 via communications unit 110. In an alternative embodiment, server 205 is integrated with data provider 210 and/or with client computer system 215.

In the exemplary embodiment, server 205 includes a database 225 that may be stored in memory 106. Moreover, in the exemplary embodiment, database 225 is a relational database, a hierarchical database, an object oriented database, and/or any structured set of data. In one embodiment, database 225 stores IT availability data, such as transactions. Server 205 receives data transactions from one or more data providers 210 and validates transaction values within the received data transactions. Data providers 210 may include, but are not limited to only including, computer systems associated with parts suppliers, service providers, customers, and/or distributors. Data transactions provided by data provider 210 correspond to database 225. For example, a data transaction may represent an update to a record within database 225 or an addition of a new record that references another record within database 225.

Server 205 interacts with one or more client computer systems 215. In an exemplary embodiment, server 205 provides IT availability information and/or IT recommendations based on the availability information, to client computer system 215. Client computer system 215 interacts with a user 230 (e.g., via user input/output unit 112 and/or display 114, shown in FIG. 1). In some embodiments, client computer system 215 is remote to server 205 and/or data provider 210. For example, client computer system 215 may be located at a support facility that is geographically removed from server 205. Such embodiments facilitate remotely identifying, communicating, and correcting transaction errors.

Figure 3:
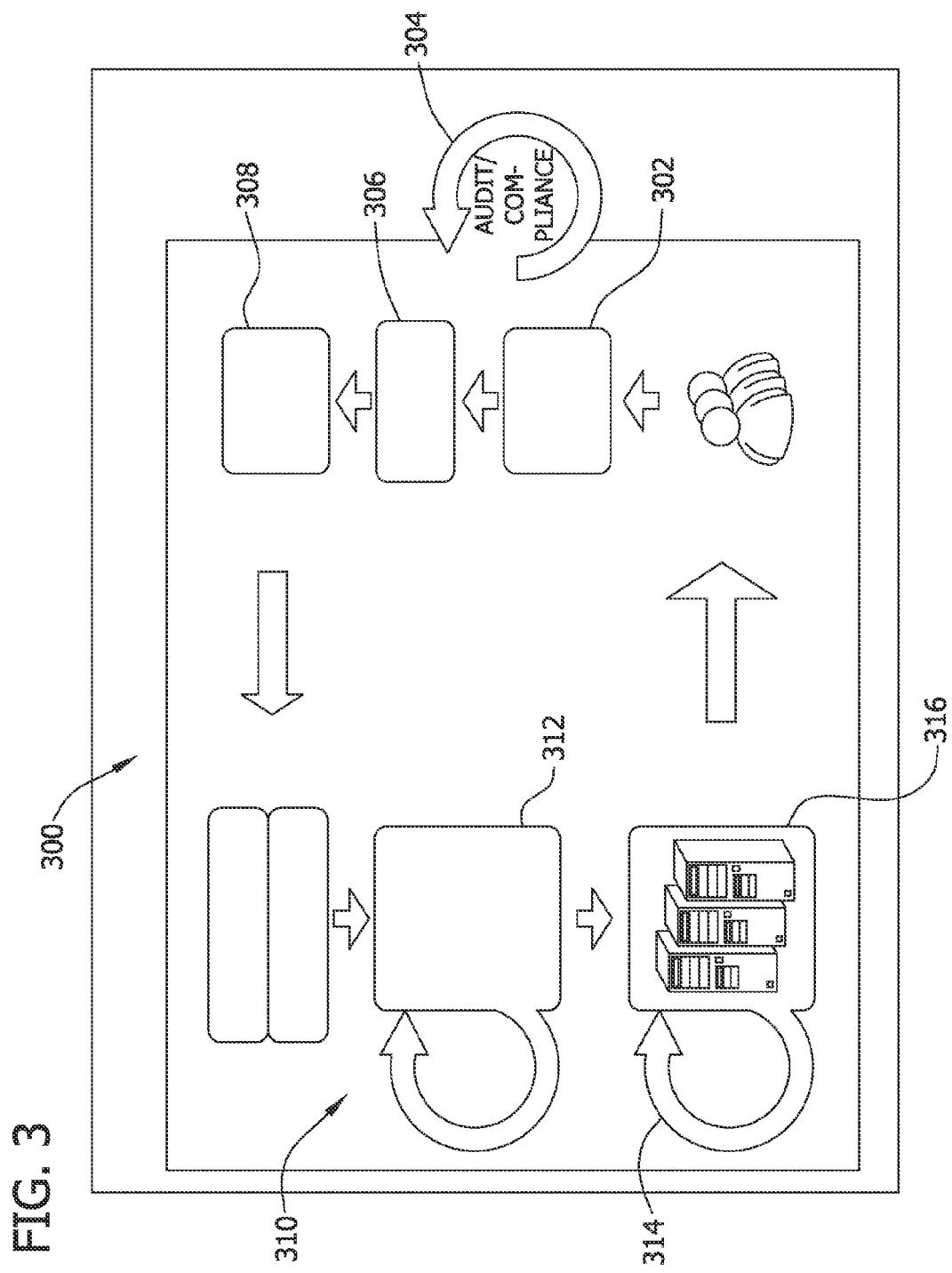
FIG. 3 is a flowchart of an exemplary service model.

FIG. 3 is a flowchart of an exemplary service model 300 for use in measuring IT availability. All or a portion of the services in service model 300 may be provided by one or more computer systems 100, such as, without limitation, server 205, data provider 210, and/or client computer system 215 (shown in FIGS. 1 and 2). Service model 300 facilitates monitoring outages and optimizing IT costs without undue complexity.

Service level management service 302 ensures that the required resources are allocated and provides the appropriate resources to specific activities in the various services' process flows. Audit and compliance service 304 is a closed loop corrective action service in which process execution errors are identified and permanent resolutions are implemented.

Service monitoring service 306 is a continuous service that measures and monitors IT transactions. In one embodiment, IT transactions are monitored by one or more computer systems 100, such as, without limitation, server 205, data provider 210, and/or client computer system 215. In one embodiment, monitoring 402 IT transactions includes monitoring requests of client 215 to at least one of data provider 210, server 205, and database 225. IT transactions include, but are not limited to, a data addition, a data update, a data deletion, and/or a data retrieval. The data transactions may be performed on any computer system 100 coupled to network 220 including, but not limited to, server 205, data provider 210, and client 215. In the exemplary embodiment, IT transactions of client 215 utilizing data stored, at least partially, on server 205 are monitored. The measured transactions are compared to pre-defined thresholds, stored on database 225, to determine IT availability. Alternatively, the pre-defined thresholds may be stored in any location that facilitates determining IT availability as described herein. In one embodiment, service monitoring service 306 monitors typical IT such as, but not limited to, infrastructure consumables, processes, messaging queues, and hardware performance. In an alternative embodiment, service monitoring service 306 monitors configuration variation, regulatory compliance, and/or service delivery performance against targets and IT costs.

The availability management service 308 manages the list of investment requests (e.g. equipment upgrade requests) and the risk of not investing (e.g. ongoing outages and repair costs). Technology insertion, IT strategy, and business strategies may also be availability management 308 decision drivers.

Design, build, and planned outage execution service 310 uses actual and forecast demand for system consumables (e.g. CPU, memory, storage, and bandwidth), availability requirements, and special configuration requirements to design infrastructure changes for new or updated applications by comparing the actual and forecast demand for system consumables against the availability requirements, and special configuration requirements. The infrastructure is built and tested according to the agreed upon schedules. Content is added and tested according to the schedules. The production system outage plan is minimized and updated with lessons learned from non-production builds. That outage plan is labor loaded by name and managed by time frames such as but not limited to, seconds, minutes, hours, and days.

Release and outage scheduling 312 is a corrective action service that compares the trade-offs between productivity gains from new functionality and integration to outage recovery cost and any added risk to delivery schedules. Plans for new software functionality, outage frequency, and outage durations are first proposed. The release and outage scheduling service 312 uses the release schedule to back into schedules for content and infrastructure testing which are then used to back into content and infrastructure design and development schedules. All schedules are labor loaded and test environments are allocated to various tests schedules. In some cases, resource constraints preclude the business units' requested outage plans and decisions are made to either invest in needed resources or change the outage frequency or duration by moving content to later releases. The outages are based on demand and external factors such as, but not limited to completion dates. Once agreed to, all IT work remains on schedule. Optimization is generally done by year and all planning resources are dedicated.

Service restoration 314 is an on demand service that provides restoration services for major failures. Service delivery 316 delivers accurate information to end users when needed. The service is provided by a set of integrated applications that are required to generate revenue on schedule. The quality measurement for is availability. The cycle time measure is transaction performance. Unit cost can be calculated and total IT cost managed.

Figure 4:
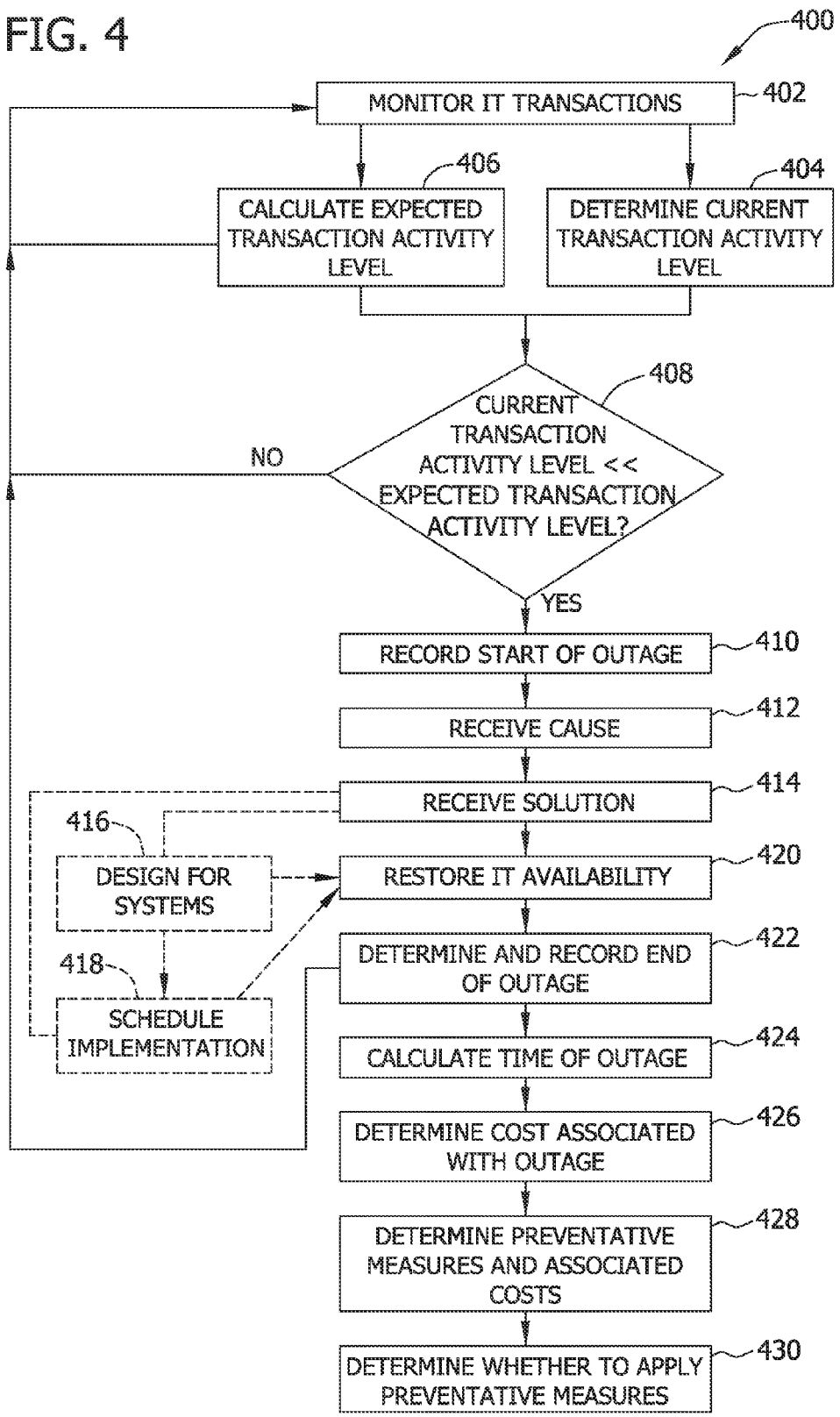
FIG. 4 is a flowchart of an exemplary method for use in measuring information technology availability using the service model shown in FIG. 3.

FIG. 4 is a flowchart of an exemplary method 400 for measuring information technology availability using the service model in FIG. 3. All or a portion of method 400 may be performed by one or more computer systems 100, such as, without limitation, server 205, data provider 210, and/or client computer system 215 (shown in FIGS. 1 and 2). In the exemplary embodiment, method 400 is performed by server 205.

In the exemplary embodiment, monitoring IT transactions 402, as described above, includes but is not limited to, IT transactions of client 215 utilizing data stored, at least partially, on server 205. Monitoring 402 IT transactions is performed by the system monitoring system 306 (shown in FIG. 3). In one embodiment, monitoring 402 IT transactions includes monitoring requests of client 215 to at least one of data provider 210, server 205, and database 225. Alternatively, monitoring 402 IT transactions includes monitoring any request of any computer system 100 connected to network 220. In the exemplary embodiment, monitoring 402 IT transactions includes determining 404 a current transaction activity level and storing the transaction activity. The current transaction activity level may be expressed as a transaction rate, such as a quantity of transactions per unit of time (e.g. second, minute, and hour).

The stored transaction activity is used to calculate 406 an expected transaction activity level for a predetermined period of time. In the exemplary embodiment, the predetermined period of time is 1 hour. Alternatively, the predetermined period of time for the expected transaction activity level can be any amount of time. The expected transaction activity level is a moving average, as an example, based on transactions in a sampling period (e.g. previous week, month, quarter, and year).

After the expected transaction activity level is calculated 406, the current transaction activity is compared to the expected transaction activity level to determine 408 whether or not an IT outage is present. An IT outage is determined 408 when the current transaction activity deviates from the expected transaction activity level by a predetermined deviation threshold value. In some embodiment the deviation threshold value is in the range of 10% to 30% (e.g. 20%). In one embodiment, an IT outage is determined 408 by calculating an expected transaction activity level as a mean/median, as an example, based on the stored transaction activity and comparing the current transaction activity level to the mean/median based expected transaction activity level. In an alternative embodiment, an IT outage is determined 408 when the current transaction activity level is less than the expected transaction activity level by more than a predetermined quantity of standard deviations (e.g. 1, 2, or 3). Alternatively, the IT outage can be determined 408 at any deviation from the expected transaction activity level.

If an IT outage is determined 408, a recording 410 is made to note the start of the outage and the cause of the outage is received 412. In the exemplary embodiment, the cause of the outage and a solution to the outage are both received 412 and 414 from the availability management service 308 which determines the cause of the outage and produces the solution. The received 412 and 412 cause and solution are made available to the design, build, and planned outage execution service 310 so that the solution may be designed 416 into the system having the outage. The designed 416 solution may be sent to the release and outage scheduling service 312 to schedule 418 implementation of the designed 416 solution. In an alternative embodiment, the produced 414 solution is sent directly to the release and outage scheduling service 312 to schedule 418 implementation of the produced 414 solution. In the exemplary embodiment, IT is restored 420 by the service restoration service 314 after a solution is produced 414. After service restoration 420, an end of the IT outage is determined 422 and recorded. The end of an IT outage is determined 422 by comparing the current transaction activity level to the expected transaction activity level.

In the exemplary embodiment, the recorded 410 start of the outage is compared with a determined 422 end of the IT outage to calculate 424 a time of the outage. The calculated 424 time of the outage is used to determine 426 a cost associated with the outage. The cost is determined 426 based on the calculated 424 time of the outage and the cost of utilizing resources during the calculated 424 time of the outage. In one embodiment, such resources include labor costs, a unit cost of labor, and/or machine resources. A labor rate schedule may be utilized to account for overtime, weekend, and holiday cost associated with the use of the resources. In another embodiment, resources are the substitution of equipment to allow a shift in services. For example, an optimized server may be rendered inoperable, in which case a server may be leased and have all services performed by the optimized server shifted to the leased server until the optimized server was rendered operable. The cost of leasing the server may be included in the cost associated with the outage.

In an alternative embodiment, the cost is determined 426 by calculating the resources needed to bring the system back to a point the system may have been had an outage not occurred. For example, if the outage occurred during an airplane assembly having a timeline, the system may calculate the overtime costs necessary to bring the assembly back in line with the timeline had the IT outage not occurred.

In the exemplary embodiment, preventative measures and costs associated are determined 428. In one embodiment the costs are determined 428 by calculating machine preventative measures and the human resources required to implement machine preventative measures required. In one embodiment the labor rate schedule is utilized to account for overtime, weekend, and holiday cost associated with implementing the machine preventative measures required. In an alternative embodiment, the costs associated with the preventative measures is determined 428 by receiving a cost from a computing device 100 or direct input. The preventative measures are recommendations that can be provided to reduce or eliminate the chances of the IT outage recurring. Once the preventative measures have been determined 428, the decision of whether or not to implement the recommended preventative measures is determined 430. In determining 430 whether or not to implement the recommended preventative measures, the costs of the outage is compared with the cost of the recommended preventive measures.

The methods described herein may be encoded as executable instructions embodied in a computer readable medium, including, without limitation, a computer storage medium, a storage device, and/or a memory device. Such instructions, when executed by a processor, cause the processor to perform at least a portion of the methods described herein.

Embodiments may be described in the general context of computer-executable instructions, such as program components or modules, executed by one or more computers or other devices. Aspects of the invention may be implemented with any number and organization of components or modules. For example, embodiments are not limited to the specific computer-executable instructions or the specific components or modules illustrated in the figures and described herein. Alternative embodiments may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

Although specific features of various embodiments of the invention may be shown in some drawings and not in others, this is for convenience only. In accordance with the principles of the invention, any feature of a drawing may be referenced and/or claimed in combination with any feature of any other drawing. An exemplary benefit of utilizing the described disclosure is that IT availability can be improved by reducing outage frequency or outage durations.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A method comprising:
monitoring, by a computing device including a processor, transaction activity level of a plurality of pre-defined IT transactions;

determining, by the computing device, that an IT outage has occurred when the activity level is below a threshold; and calculating a cost of utilizing substituted resources during an elapsed time of the IT outage.

2. A method in accordance with claim 1, further comprising:

receiving a cause of the IT outage; and producing a recommendation of one or more preventative measures, by the computing device, based on the IT outage and the received cause.

3. A method in accordance with claim 2, further comprising determining a cost associated with implementing the produced recommendation.

4. A method in accordance with claim 1, further comprising, creating an expected transaction activity level based on the monitored IT transactions.

5. A method in accordance with claim 1, wherein monitoring, by a computing device including a processor, transaction activity level of a plurality of pre-defined IT transactions comprises monitoring requests of a client to at least one of a data provider, a server, and a database.

6. A method in accordance with claim 1, wherein monitoring, by a computing device including a processor, transaction activity level of a plurality of pre-defined IT transactions comprises monitoring at least one of a data addition, a data update, a data deletion, and/or a data retrieval.

7. A method in accordance with claim 1, wherein the IT outage occurs when a statistical measure of a current transaction activity level is less than a statistical measure of an expected transaction activity level.

8. A method in accordance with claim 1, wherein calculating a cost of utilizing substituted resources further comprises calculating a cost of utilizing additional resources to recover productivity lost during the IT outage.

9. A device for use in determining a cost of an information technology (IT) outage, said system comprising:

a memory configured to store an expected transaction activity level;

a communications unit configured to monitor IT transactions;

at least one processor coupled to said memory and said communications unit, wherein said processor is programmed to:

determine that an IT outage has occurred based on the monitored IT transactions and the expected transaction activity level;

determine a cost of utilizing substituted resources during an elapsed time of the IT outage.

10. A device in accordance with claim 9, wherein the processor is further programmed to:

receive a cause of the IT outage;

receive a solution to restore the IT outage, based on the received cause; and produce a recommendation of preventative measures using the received cause of the IT outage and the received solution.

11. A device in accordance with claim 10, wherein the processor is further programmed to determine a cost associated with implementing the produced recommendation.

12. A device in accordance with claim 9, wherein the processor is further programmed to create an average IT transaction rate based on the monitored IT transactions.

13. A device in accordance with claim 12, wherein the processor is further programmed to determine a current transaction activity level based on the monitored IT transactions.

14. A device in accordance with claim 13, wherein the processor is further programmed to compare the current IT transactions and the average IT transaction rate.

15. A device in accordance with claim 9, wherein the processor is further programmed to calculate a cost of utilizing additional resources to recover productivity lost during the IT outage.

16. A computer program product comprising computer-readable memory and program code having computer-executable components, said components comprising:

a monitoring component that when executed by at least one processor unit causes the at least one processor unit to determine that an IT outage has occurred; and a recommendation component that when executed by at least one processor unit causes the at least one processor unit to determine a cost of utilizing substituted resources during an elapsed time of the IT outage.

17. A computer program product in accordance with claim 16, wherein the recommendation component, when executed by the at least one processor further causes the at least one processor to produce a recommendation based on the IT outage, information associated with a cause of the IT outage, and a cost associated with implementing the produced recommendation.

18. A device for use in determining a cost of an information technology (IT) outage, said system comprising:

a memory configured to store an expected transaction activity level;

a communications unit configured to monitor IT transactions;

at least one processor coupled to said memory and said communications unit, wherein said processor is programmed to:

determine that an IT outage has occurred based on the monitored IT transactions and the expected transaction activity level;

receive a cause of an IT outage;

receive a solution to restore the IT outage, based on the received cause;

determine a cost associated with the IT outage based at least in part on an elapsed time of the IT outage.

* * * * *